United States Patent
Anac et al.

(10) Patent No.: US 10,415,994 B2
(45) Date of Patent: Sep. 17, 2019

(54) GYROSCOPE SELF TEST BY APPLYING ROTATION ON CORIOLIS SENSE MASS

(71) Applicant: Invensense, Inc., San Jose, CA (US)

(72) Inventors: Ozan Anac, Sunnyvale, CA (US); Joseph Seeger, Menlo Park, CA (US)

(73) Assignee: INVENSENSE, INC., San Jose, CA (US)

( * ) Notice: Subject to any disclaimer, the term of this patent is extended or adjusted under 35 U.S.C. 154(b) by 146 days.

(21) Appl. No.: 15/644,534

(22) Filed: Jul. 7, 2017

(65) Prior Publication Data
US 2017/0314960 A1   Nov. 2, 2017

Related U.S. Application Data

(60) Division of application No. 13/862,352, filed on Apr. 12, 2013, now Pat. No. 9,714,842, and a continuation-in-part of application No. 13/235,296, filed on Sep. 16, 2011, now Pat. No. 8,833,162.

(60) Provisional application No. 61/721,394, filed on Nov. 1, 2012.

(51) Int. Cl.
| | |
|---|---|
| *G01C 25/00* | (2006.01) |
| *G01C 19/56* | (2012.01) |
| *G01C 19/574* | (2012.01) |
| *G01C 19/5712* | (2012.01) |

(52) U.S. Cl.
CPC ............ *G01C 25/00* (2013.01); *G01C 19/56* (2013.01); *G01C 19/574* (2013.01); *G01C 19/5712* (2013.01); *G01C 25/005* (2013.01)

(58) Field of Classification Search
CPC .. G01C 19/56; G01C 19/5712; G01C 19/574; G01C 25/00; G01C 25/005
See application file for complete search history.

(56) References Cited

U.S. PATENT DOCUMENTS

| | | |
|---|---|---|
| 4,510,802 A | 4/1985 | Peters |
| 5,895,850 A | 4/1999 | Buestgens |
| 5,992,233 A | 11/1999 | Clark |
| 6,230,563 B1 | 5/2001 | Clark et al. |
| 6,250,156 B1 | 6/2001 | Seshia et al. |
| 6,508,122 B1 | 1/2003 | McCall et al. |
| 6,520,017 B1 | 2/2003 | Schoefthaler et al. |
| 6,845,669 B2 | 1/2005 | Acar et al. |
| 6,892,575 B2 | 5/2005 | Nasiri et al. |
| 6,939,473 B2 | 9/2005 | Nasiri et al. |
| 2003/0200804 A1 | 10/2003 | Johnson |
| 2004/0211258 A1 | 10/2004 | Geen |
| 2005/0072231 A1 | 4/2005 | Chojnacki et al. |
| 2005/0081631 A1 | 4/2005 | Weinberg et al. |
| 2005/0081633 A1 | 4/2005 | Nasiri et al. |
| 2005/0199061 A1 | 9/2005 | Acar et al. |

(Continued)

*Primary Examiner* — Francis C Gray
(74) *Attorney, Agent, or Firm* — Maryam Imam; Hickman Palermo Becker Bingham LLP

(57) ABSTRACT

A self-test method by rotating the proof mass at a high frequency enables testing the functionality of both the drive and sense systems at the same time. In this method, the proof mass is rotated at a drive frequency. An input force which is substantially two times the drive frequency is applied to the actuation structures to rotate the proof mass of the gyroscope around the sensitive axis orthogonal to the drive axis. An output response of the gyroscope at the drive frequency is detected by a circuitry and a self-test response is obtained.

17 Claims, 6 Drawing Sheets

(56) References Cited

U.S. PATENT DOCUMENTS

| | | | |
|---|---|---|---|
| 2008/0190199 A1* | 8/2008 | Prandi | G01C 19/5726 73/504.12 |
| 2009/0114016 A1 | 5/2009 | Nasiri et al. | |
| 2009/0260437 A1 | 10/2009 | Blomqvist | |
| 2010/0071467 A1 | 3/2010 | Nasiri et al. | |
| 2010/0222998 A1 | 9/2010 | Blomqvist | |
| 2011/0061460 A1 | 3/2011 | Seeger et al. | |
| 2011/0146402 A1* | 6/2011 | Donadel | G01C 19/56 73/504.12 |
| 2012/0272711 A1* | 11/2012 | Supino | G01C 19/5776 73/1.38 |
| 2013/0233048 A1* | 9/2013 | Anac | G01C 25/005 73/1.77 |
| 2017/0167876 A1* | 6/2017 | Coronato | G01C 19/5719 |
| 2017/0343351 A1* | 11/2017 | Tormalehto | G01C 19/5712 |

* cited by examiner

700

GYROSCOPE SELF TEST BY APPLYING ROTATION ON CORIOLIS SENSE MASS

CROSS REFERENCE TO RELATED APPLICATIONS

This application is a divisional application of U.S. patent application Ser. No. 13/862,352, filed on Apr. 12, 2013, by Ozan Anac and Joseph Seeger, entitled "GYROSCOPE SELF TEST BY APPLYING ROTATION ON CORIOLIS SENSE MASS", which claims priority to U.S. Provisional Application No. 61/721,394, filed on Nov. 1, 2012, by Ozan Anac and Joseph Seeger, and entitled "Gyroscope Self Test by Applying Rotation on Coriolis Sense Mass" and is a continuation-in-part of U.S. patent application Ser. No. 13/235,296, filed on Sep. 16, 2011, by Joseph Seeger and entitled "Micromachined Gyroscope Including a Guided Mass System".

BACKGROUND

Gyroscopes are sensors mounted in a sensor package, which are used to sense rotations of the platforms to which they are attached. When the sensor package that is attached to the platform is rotated, the gyroscope gives an output which is proportional to the angular velocity.

By way of background, sensing of angular velocity is frequently performed using vibratory rate gyroscopes. Vibratory rate gyroscopes broadly function by driving the sensor into a first motion and measuring a second motion of the sensor that is responsive to both the first motion and the angular velocity to be sensed.

Frequently, a mass, usually referred to as a proof mass, within the sensor is driven into oscillation by an actuator. Rotation of the sensor, imparts a Coriolis force to the oscillating mass that is proportional to the angular velocity (or rotation rate), and Coriolis force depends on the orientation of the angular velocity vector with respect to the velocity vector of the proof mass. The Coriolis force is perpendicular to the angular velocity vector, and the proof-mass velocity vector. The governing equation for the Coriolis force vector is represented as follows:

$$\vec{F}_{Coriolis} = 2m\vec{V}_d \times \vec{\Omega} \qquad \text{Eq. (1)}$$

where, $\vec{F}_{Coriolis}$ is the Coriolis force imparted to the structure (or proof mass), m is the mass of the proof mass, $\vec{V}_d$ is the velocity of the proof mass in the drive direction, $\vec{\Omega}$ is angular velocity input. For example, a proof mass moving in an x-direction within a sensor rotating about the y-axis experiences a z-axis-directed Coriolis force. Similarly, a proof mass moving in the x-direction within a sensor rotating about a z-axis experiences a y-axis-directed Coriolis force. Finally, a proof-mass moving in the x-direction within a sensor rotating about the x-axis experiences no Coriolis force. Coriolis forces imparted to the proof-mass are usually sensed indirectly by measuring motions within the sensor that are responsive to the Coriolis forces.

If it is desirable to test the gyroscope in terms of its functionality, the sensor package can be rotated and the output of the gyroscope is monitored to determine if the gyroscope is responding to the given input rotation. A drawback of moving the sensor package to test the functionality of the gyroscope is the need for costly testing platforms and the large amount of time consumed to do the testing.

On the other hand, there are also other ways to test gyroscope functionality without moving the sensor package. One of the methods that is widely used to test the gyroscope functionality is called self-test. Self-test in gyroscopes is defined as the testing of the gyroscope functionality without physically rotating the sensor package.

Conventional gyroscopes comprise two main systems. One of the systems is called the drive system, and the second system is called the sense system. In a conventional gyroscope, the output response to the given rotation input depends on both the drive and sense systems. In order to test full functionality of the gyroscope, both systems have to be tested for functionality in the self-test operation.

More specifically, in currently-implemented self-test methods, there are two primary approaches for testing the sensor functionality. A first method includes an actuation mechanism that vibrates the proof mass of the gyroscope in a direction along the responsive axis (also known as the "sense axis"). In this method, the proof mass of the gyroscope is vibrated with a known input force in the sensitive direction, and the output of the sense system is monitored to determine if the output response is at a desired level. With this method, demonstrating the drive system functionality requires additional testing to be applied on the drive system mechanisms. As a result, sense and drive systems cannot be tested simultaneously, and this requires extra time and effort to complete full functionality testing of the entire gyroscope.

A second method includes an actuation mechanism that can rotate the proof mass of the gyroscope along the sensitive axis (or "direction"). In this method, a known input rotation is applied to the proof mass at the chip level at a low frequency range. The low frequency range can be in the range of a couple of Hertz (Hz) to 500 Hz depending on the bandwidth of the gyroscope. In this second method, the proof mass is usually attached to a frame structure that supports the entire gyroscope and the frame structure is used to rotate the entire proof mass around the sensitive axis. With this method, however, because the self-test actuation is completed at low frequencies, the frame structure has to be particularly compliant to move large angles at sufficiently high angular rates in order to get a detectable self-test output. Compliant frame structures make the sensor more susceptible to unwanted external effects, like package stresses and vibrations, which can adversely affect the regular operation of the gyroscope. Moreover, due to the high compliance of the frame structure, the gyroscope is undesirably less stable against external mechanical shocks.

There is thus a need for a method and apparatus for reliably testing the full functionality of the gyroscope while maintaining the stability against unwanted external disturbances that may affect its regular operation.

SUMMARY

Briefly, an embodiment of the invention includes a gyroscope with a proof mass that vibrates in a first direction at a drive frequency, and an actuator operable to rotate the proof mass around an input axis to generate a Coriolis force on the proof mass using a signal with a frequency that is substantially two times the drive frequency.

A further understanding of the nature and the advantages of particular embodiments disclosed herein may be realized by reference of the remaining portions of the specification and the attached drawings.

DETAILED DESCRIPTION OF EMBODIMENTS

The following describes a gyroscope with a proof mass that vibrates in a first direction at a drive frequency, and an actuator operable to rotate the proof mass around an input axis to generate a Coriolis force on the proof mass using a signal with a frequency that is substantially two times the drive frequency.

In accordance with a method for accomplishing the foregoing, the drive system of the gyroscope is vibrated at a drive frequency (fd) along the drive axis as in the regular operation of the gyroscope. Then, an input force, which is substantially two times the drive frequency (2fd), is applied to the actuation structures (or "actuators"). Actuation structures rotate the proof mass around the sensitive axis, which is orthogonal to the drive axis, at the applied frequency (2fd).

Finally, the output response of the gyroscope at the drive frequency (fd) is detected by a circuitry and a self-test response is obtained. Implementation of this self-test method requires rotation of the proof mass at a high frequency and exhibits two primary advantages in that, first, because the vibrating proof mass of the gyroscope is rotated, it is possible to test the functionality of both the drive and sense systems simultaneously. Second, mechanical self-test actuation structures that are vibrated at high frequencies have to be stiffer structures with lower deflection compared to the ones that are actuated at lower frequencies. Stiffer structures are less sensitive against unwanted external effects like package stresses and vibrations which can jeopardize the ideal operation of the gyroscope. Also, due to the high stiffness of actuation mechanisms, the gyroscope is more stable against the external mechanical shocks. Moreover, in order to obtain the high stiffness in the self-test actuation structures, the flexible components of the system has to be smaller which saves the area.

In addition, since this method physically rotates the sensitive proof masses, it can also be used for calibration of the gyroscope by changing the sense system gain based on a known self-test response.

Figure 1:
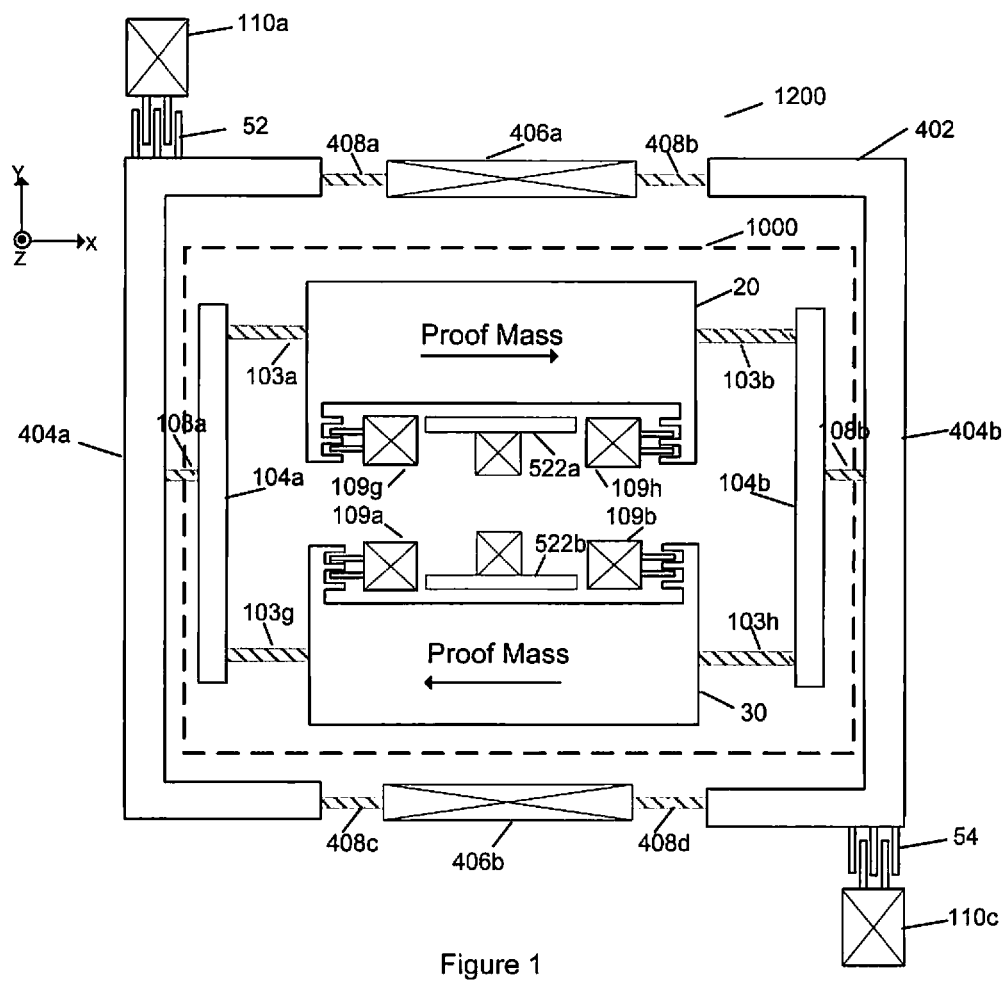
FIG. 1 shows a multiple guided mass system 1200 with single axis gyroscope structure 1000, in accordance with an embodiment of the invention.

Referring to FIG. 1, a part of a multiple guided mass system 1200 is shown in accordance with an embodiment of the invention. The multiple guided mass system 1200 is shown to include a proof mass 20 and a proof mass 30, each of which are a part of a single axis gyroscope 1000, which can be used to detect the angular velocity applied around the Z axis (yaw input axis). The gyroscope 1000 is shown surrounded by the stress relief frame 402, which is one of the main elements of the multiple guided mass system 1200. The gyroscope 1000 is further shown to include the springs 103a, b, g, and h (collectively can be called as spring 103) and guiding arms 104a and 104b. The springs 103 are used to connect the proof masses 20 and 30 to the guiding arms 104a and 104b.

The stress relief frame 402 is shown connected to the guiding arms 104a and 104b via springs 108a and 108b and surrounds the gyroscope 1000. The stress relief frame 402 includes two stress relief frame members 404a and 404b which are coupled to the anchors 406a and 406b, respectively via stress relief springs 408a-d. The stress relief members 404a and 404b can also be flexible.

For example, the frame member 404a is shown connected to the anchor 406a through the stress relief spring 408a and to the anchor 406b through the stress relief spring 408c, and the frame member 404b is shown connected to the anchor 406a through the stress relief spring 408b and to the anchor 406b through the stress relief spring 408d.

Electrostatic actuators 109a-b and 109g-h, such as comb drives, are connected to the proof masses 20 and 30 to drive the system 1200 at a specific frequency (drive frequency). In another embodiment, the actuator can be electrostatic parallel plate type. The proof masses 20 and 30 are driven anti-phase along the x axis with an electrostatic force at the drive frequency which is generated by the AC voltage signal applied by a single drive circuit coupled to the actuators 109a-b and 109g-h and not shown in FIG. 1.

Angular velocity about the yaw-input axis will cause Coriolis forces to act on the proof-masses 20 and 30 resulting in motion of the proof-masses 20 and 30 anti-phase along the y-direction. The amplitude of the motion of the proof-masses along the y-direction is proportional to the angular velocity. Transducers 522a and 522b are used to detect the motion of the respective proof masses 20 and 30 along the y-direction.

The comb drive structures 52 and 54 have a fixed portion connected to the anchors 110a and 110c and, a moveable portion connected to the frame. When a voltage difference is applied between the fixed portion and the moveable portion, an electrostatic force is generated which acts on the frame.

During self-test or calibration of the gyroscope 1000, the proof masses 20 and 30 are actuated anti-phase along the x direction at the drive frequency and a self-test actuation signal, which is substantially two times the drive frequency, generated by a circuit not shown in FIG. 1, is applied to the actuators 52 and 54. As a result of the self-test actuation signal, electrostatic forces are generated on the actuators that act on the frame resulting the motion of the masses 404a and 404b anti-phase along the y-direction. Frame masses 404a and 404b are connected to the guiding arms 104a and 104b via springs 108a and 108b respectively. Guiding arms 104a and 104b are connected to the proof masses 20 and 30 via the springs 103a-b and 103g-h. As a result of the anti-phase motion of the masses 404a and 404b, the lever arms 104a and 104b connected to the 404a and 404b moves anti-phase in y direction as well. Anti-phase y-direction motion of the lever arms 104a and 104b results in rotation of the proof masses 20 and 30 at substantially two times the drive frequency about axes parallel to each other and aligned in the z-direction. "Substantially" two times the drive frequency is defined by the bandwidth of the gyroscope 1000 or the bandwidth of a low pass filter that is part of the circuit generating the drive signal. Rotation of the proof masses of the single axis gyroscope around the z-axis causes Coriolis forces to act on the proof masses 20 and 30 resulting in motion of the proof masses 20 and 30 anti-phase along the y-direction. The y-direction motion can be detected by the transducers 522a and 522b and read at the final output as a self-test response by the help of a read-out circuitry that is connected to the transducers. The basic concept of the self-test actuation and detection in the single axis gyroscope can be applied to the multi-axis gyroscopes. The example of a 3-axis gyroscope with self-test implementation is given below in the explanation of FIG. 2.

Figure 2:
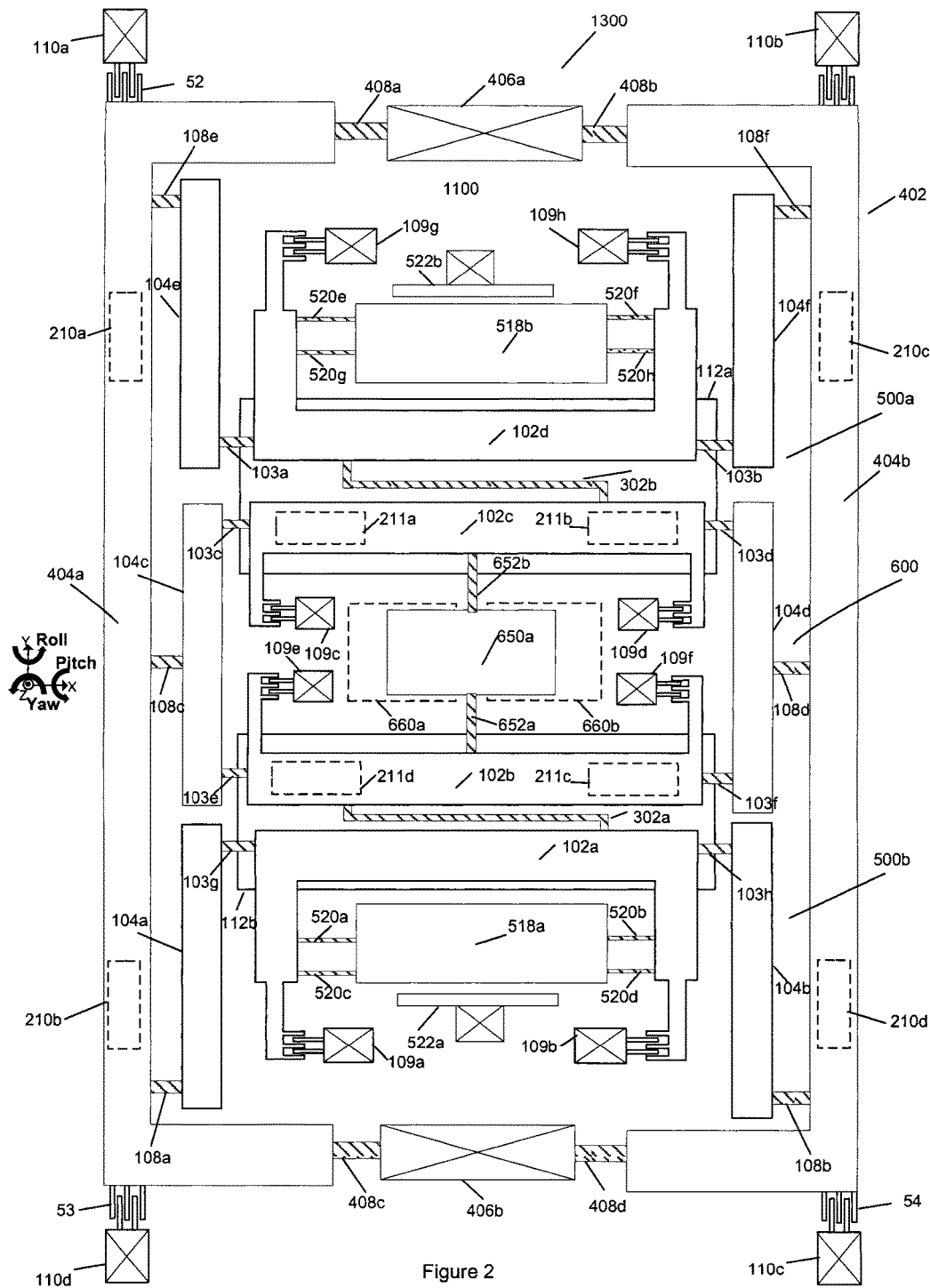
FIG. 2 shows a multiple guided mass system 1300 with three axis gyroscope structure 1100, in accordance with the embodiment of the invention.

FIG. 2 shows details of the multiple guided mass system 1300, in accordance with the embodiment of the invention. The system 1300 is built on a substrate and connected thereto using the anchors 406a and 406b through the springs 408a-d. Actuators 210a and 210b are shown formed under the frame member 404a and actuators 210c and 210d are shown formed under the frame member 404b. Moreover, comb drive actuators 51, 52, 53, and 54 attached the stress-relief frame 402.

The gyroscope 1100, which is a part of multiple guided mass system 1300, is shown to include the proof masses, 518a, 518b, 102 a-d and 650a. Gyroscope 1100 is a multi-axis version of the gyroscope 1000. The proof mass 518b is shown partially surrounded, at the bottom, by a sub-frame 102d, which may be regarded as a part of the proof mass 518b, in some embodiments. The sub-frame 102d is shown connected to the comb structures 109g and 109h The proof mass 518a is shown partially surrounded, at the top, by a sub-frame 102a, which may be regarded as a part of the proof mass 518a, in some embodiments. The proof mass 650a is shown partially surrounded, on top, by a sub-frame 102c, and partially surrounded at the bottom by a sub-frame 102b, each of the sub-frames 102c and 102b may be a part of the proof mass 650a, in some embodiments. Two self-test actuation electrodes 211a and 211b, are shown formed below the sub-frame 102c, and two actuation electrodes, 211c and 211d, are shown formed below the sub-frame 102b. Further, a transducer, 112a is shown formed below the sub-frames 102d and 102c to detect the out of plane motion sub-frames, and a transducer, 112b, is shown formed below the sub-frames 102b and 102a to detect the out of plane motion of the sub-frames. For further details of the embodiments of FIGS. 1 and 2, the reader is referred to U.S. patent application Ser. No. 13/235,296, filed on Sep. 16, 2011, by Joseph Seeger and entitled "Micromachined Gyroscope Including a Guided Mass System", the contents of which are incorporated herein by reference as though set forth in full.

Electrostatic actuators 109c-f, such as comb drives, are connected to the sub-frames 102b and c to drive the system 1300. The sub-frames 102a-d and the proof mass 650a are driven together at a drive frequency by a single drive circuit coupled to the actuators 109c-f.

In FIG. 2, the proof mass 518b and surrounding structures, such as the sub-frame 102d, the comb structures 109g and h, the springs 520e-h, the springs 103a and b, the guiding arms 104e and f and all other structures form a guided mass system 500a. Similarly, the proof mass 518a and surrounding structures, such as the sub-frame 102a, the comb structures 109a and b, the springs 520a-d, the springs 103g and h, the guiding arms 104a and b and all other structures form a guided mass system 500b. The proof mass 650a and surrounding structures, such as the sub-frames 102b and c, the actuators 109c-f, the springs 103c-f, the guiding arms 104c and d, the transducers 660a and b, the springs 652a and b, the electrodes 211a-d, and all other structures form a guided mass system 600.

Figure 3:
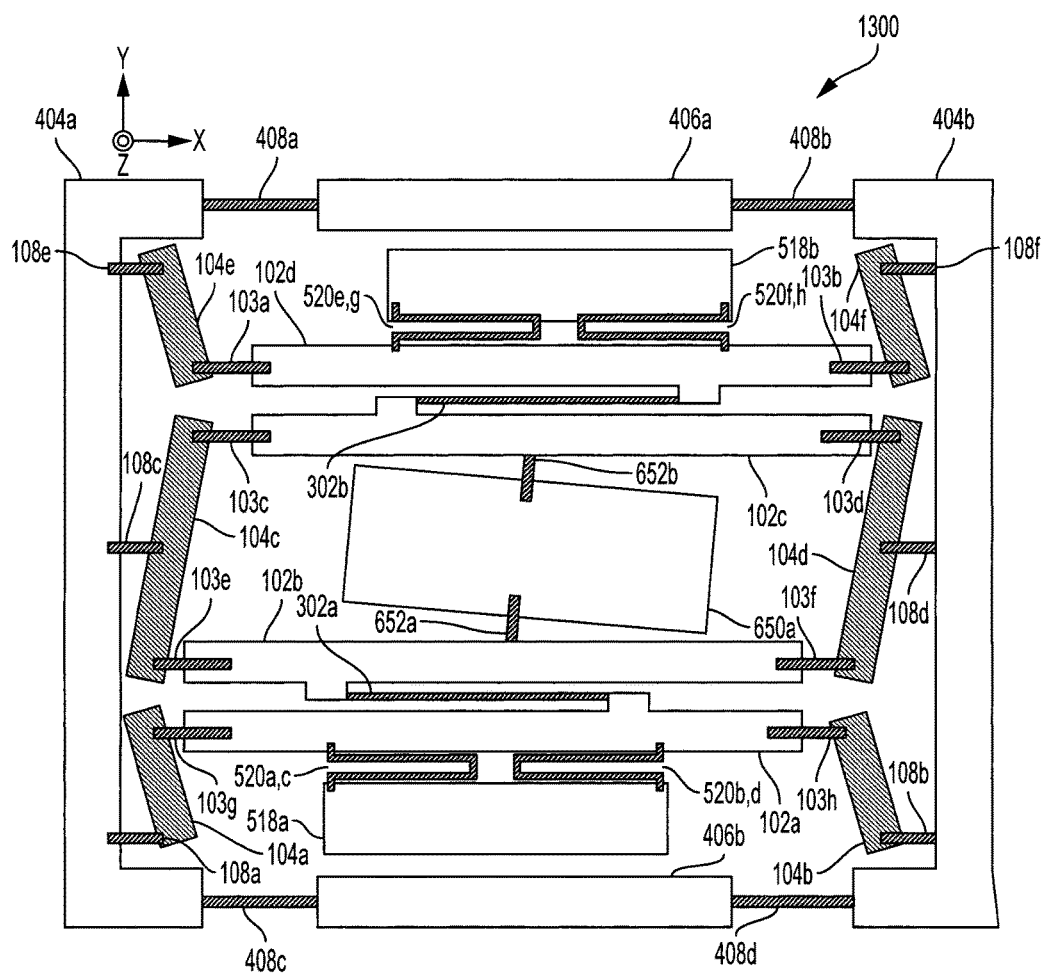
FIG. 3 shows the motion of the proof masses of the gyroscope 1300 during the drive direction motion, in accordance with the embodiment of the invention.

The guided mass systems 500a, 500b and 600 are arranged so that when the roll proof-masses 102a-d all move in the x-direction, the pitch proof-mass 650a rotates about an axis in the z-direction, and the yaw proof-masses 518a and 518b move anti-phase in the x-direction, as shown in FIG. 3. The guided mass systems 500a, 500b, and 600 are driven together at a drive frequency (fd) by a single drive circuit coupled to the actuators 109 c-f. The motion of the proof masses at the drive frequency is named as drive motion. The drive motion can be detected by the use of the electrostatic comb structures 109 a-b and 109 g-h.

Angular velocity about the pitch-input axis will cause Coriolis forces to act on the pitch proof mass 650a resulting in a torque that rotates the pitch proof mass 650a about the pitch-sense axis. The amplitude of the rotation of the pitch proof-mass 650a is proportional to the angular velocity about the pitch-input axis. Transducers 660a and 660b are disposed on opposite sides along the x-direction under the pitch proof-mass 650a and detect the rotation of the pitch proof-mass about the pitch-sense axis. The rotation provides a measure of the angular velocity about the pitch-input axis.

Angular velocity about the roll-input axis will cause Coriolis forces to act on the roll proof-masses 102a and 102b in a z-direction and on roll proof-masses 102c and 102d in the opposite z-direction. The Coriolis forces cause the guided mass systems 500a, 600, and 500b to rotate out-of-plane about the first, second, and third roll-sense axis respectively. Transducer 112a under the roll proof masses 102a and 102b and transducer 112b under the roll proof masses 102c and 102d are used to detect the rotation of the guided mass system 1100. This rotation provides a measure of the angular velocity about the roll-input axis.

Angular velocity about the yaw-input axis will cause Coriolis forces to act on the yaw proof-masses 518a and 518b resulting in motion of the yaw proof-masses 518a and 518b anti-phase along the y-direction. The amplitude of the motion of the yaw proof-masses along the y-direction is proportional to the angular velocity. Transducers 522a and 522b are used to sense the motion of the respective yaw proof masses 518a and 518b along the y-direction.

The gyroscope structure shown in FIG. 2 is used to detect the angular velocities applied in 3 different axes. Angular velocities applied in roll, pitch and yaw axes can be applied externally by rotating the sensor package. This rotation can also be applied inside the chip by imparting rotation to the roll, pitch and yaw proof-masses by using self-test actuation structures.

As previously noted, the gyroscope 1300 is shown to include a frame, the stress relief frame 402, further details of which are disclosed in the U.S. Patent Application incorporated herein. The stress relief frame is a guided mass system that can also be used to impart rotations to the roll proof mass 102 a-d and yaw proof-masses 518 a-b. Comb structures 110a-d added to the tri-axis gyroscope in order to actuate the stress relief frame along the y-direction. The stress relief frame is actuated by the comb structures 110a-d which results in the motion of the masses 404a and 404b anti-phase along the y-direction. Since the stress relief frame 402 is connected to the guiding arms 104a-f via springs 108a-f respectively, y-direction anti-phase motion of 404a and 404b causes anti-phase motion of the lever arms 104e and 104f which are connected to the roll proof mass 102d via springs 103a and 103b. Roll proof mass 102d is connected to the yaw proof mass 518b via springs 520 e-h. Consequently, anti-phase motion of the lever arms 104e and 104f results in rotation of 102d and 518b about an axes that is aligned in the Z direction. Similar to the rotation of the proof mass 518b, the other yaw proof mass 518a is also rotated about an axis aligned in the Z direction and parallel to the rotation axis of yaw proof mass 518b. Rotation of the yaw proof masses 518a-b around an axis that is aligned in the Z direction causes Coriolis forces to act on the yaw proof-masses 518a and 518b resulting in anti-phase motion of the yaw proof-masses 518a and 518b along the y-direction which can be detected by the transducers 522 a and 522b, respectively.

The electrodes 210a-d are placed on the substrate under the stress relief frame 402. The electrodes are used as actuation mechanisms to impart out-of plane forces to the stress relief frame 402. Using the actuation electrodes 210a-d, anti-phase forces, in the z-direction, are applied to the stress relief frame 402 resulting in the masses 404a and 404b moving anti-phase along the z-direction, and rotation of the stress-relief frame 402 around the y-axis. Because the stress relief frame 402 is connected to the guiding arms 104a-f via springs 108a-f respectively, the entire tri-axis gyroscope structure rotates around the y-axis (roll-axis) due to the imparted torque resulted by rotation of the stress-relief frame 402. Angular velocity about the roll-input axis causes Coriolis forces to act on the roll proof-masses 102a and 102b in a z-direction and on roll proof-masses 102c and 102d in the opposite z-direction. The Coriolis forces cause the guided mass systems 500a, 600, and 500b to rotate out-of-plane about the first, second, and third roll-sense axis respectively. Transducer 112a under the roll proof masses 102a and 102b and transducer 112b under the roll proof masses 102c and 102d are used to detect the rotation of the guided mass systems 500a, 600, and 500b.

The electrodes 211a-d are formed on the substrate under the roll-proof masses 102b and 102c. The electrodes 211a-d are used to impart out-of plane forces to the proof-masses 102b and 102c. By the use of the electrodes 211a-d anti-phase forces in the z-direction are imparted to the proof masses 102b and 102c resulting in the masses moving anti-phase along the z-direction. Anti-phase motion of the roll-proof masses along the z-direction results in rotation of the pitch proof mass around the x-axis. Angular velocity of the pitch proof-mass around the x-axis causes Coriolis forces to act on the pitch proof mass 650a resulting in a torque that rotates the pitch proof mass 650a about the pitch-sense axis. The amplitude of the rotation of the pitch proof-mass 650a is proportional to the angular velocity about the pitch-input axis. Transducers 660a and 660b are disposed on opposite sides along the x-direction under the pitch proof mass 650a and detect the rotation of the pitch proof-mass about the pitch-sense axis.

The rotation applied to the roll, pitch and yaw-proof masses imparts Coriolis forces to the proof masses and the Coriolis force generates motion on the proof mass in the sensing direction for each axes and the sense motion is sensed by the transducers. When a drive force applied to the roll, pitch and yaw proof masses by the use of the comb structures 109c-f, the proof masses move in the drive mode as it is shown in FIG-3. The drive force applied to the proof masses results in displacement and velocity of the proof masses as in the equations given below:

$$x_d = X_d \sin(\omega_d t) \quad \text{Eq. (2)}$$

$$V_d = X_d \omega_d \cos(\omega_d t) \quad \text{Eq. (3)}$$

Where, $x_d$ is the drive amplitude, $\omega_d$ is the drive frequency and $V_d$ is the drive velocity.

The Coriolis force imparted to the proof masses as a result of input rotation can be expressed as:

$$F_{Coriolis} = 2mX_d \omega_d \cos(\omega_d t)\Omega \quad \text{Eq. (4)}$$

The Coriolis force is the result of multiplication of the mass of the proof masses (m), velocity of the proof mass at the drive frequency ($\omega_d$) and the applied rotation rate ($\Omega$). The rotation rate can be applied in various frequencies including the frequency which is substantially two times the drive frequency. Application of the self-test signal at a frequency which is two times the drive frequency of the gyroscope cause the self-test actuators to rotate the roll, pitch or yaw proof masses around the sensitive axes and result in an angular velocity component as in the equation given below:

$$\Omega = |\theta| 2\omega_d \cos(2\omega_d t) \quad \text{Eq. (5)}$$

Where, $|\theta|$ is the amplitude of the rotation.

When the angular velocity, expressed by Eq. (5) above is used in the Coriolis force formula given in Equation-4, the resulting Coriolis force can be given as below:

$$F_{Coriolis} = 2mX_d \omega_d^2 |\theta|[\cos(\omega_d t) + \cos(3\omega_d t)] \quad \text{Eq. (6)}$$

As it can be seen in Equation-6, the Coriolis force generated by the self-test input has two components, one of them is at the drive frequency and the other component is at three times the drive frequency. The amplitude of the Coriolis force generated by the self-test input depends on the drive amplitude ($X_d$) and drive frequency ($\omega_d$). When the Coriolis force is imparted to the proof mass, the proof mass responds in the sensitive direction which can be detected by electronics circuit as a self-test output response. Typically, the mechanical structures have higher response to the Coriolis force at the drive frequency. Since the Coriolis force imparts force on the proof-mass and the proof mass moves in the sense direction, and since the Coriolis force is proportional to the drive frequency and drive amplitude, the self-test method simultaneously demonstrates the functionality of both the drive and sense systems. In conclusion, if the proof masses of the gyroscope are rotated by the application of self-test input which is substantially two times the drive frequency, the full functionality of the gyroscope can be tested by monitoring the amplitude of the self-test response.

Figure 4:
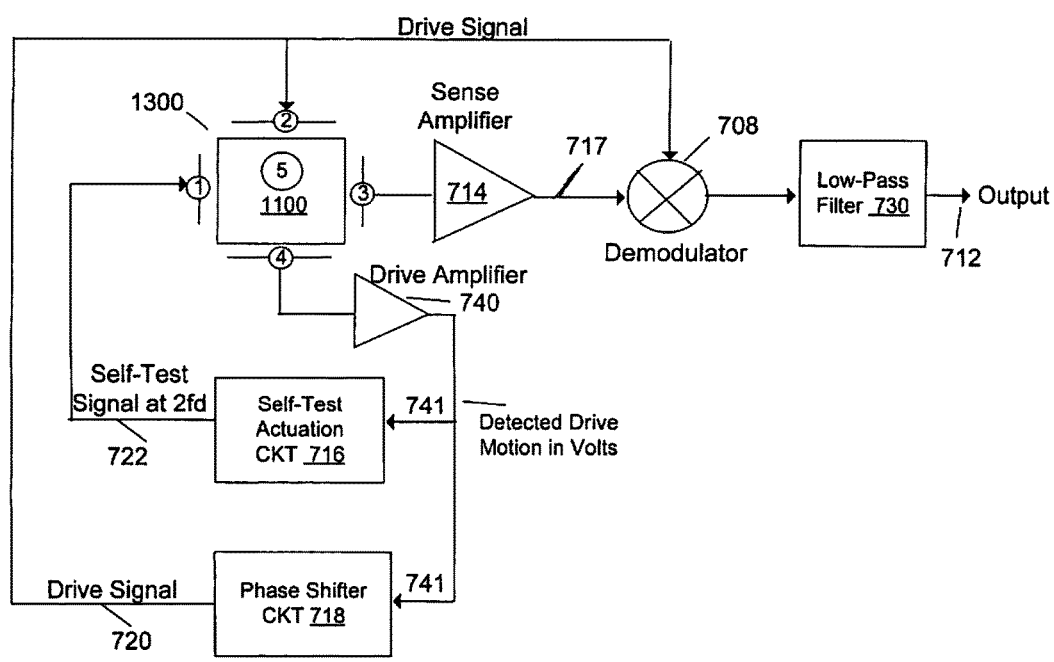
FIG. 4 shows a block diagram of a circuit 700 coupled to the gyroscope 1300, in accordance with another embodiment of the invention.

FIG. 4 shows a block diagram of a circuit 700 coupled to the multiple guided mass system 1300, in accordance with another embodiment of the invention. The circuit 700 drives the gyroscope 1100 at a drive frequency through the actuators of the system 1300, as will be evident shortly the drive frequency can be a resonant frequency of the multi-axis gyroscope 1100. FIG. 4 illustrates the drive circuitry for multiple guided mass system 1300, and single axis self-test actuation and detection. The testing scheme can be extended to multiple axes.

The circuit 700 generates a self-test signal 722 which is substantially at two times the drive frequency. The circuit 700 is shown to include a self-test actuation circuit 716, phase shifter circuit 718, a drive amplifier 740, a sense amplifier 714, a demodulator 708, and a low pass filter 730, in accordance with an embodiment of the invention. The circuit 716 and the circuit 718 are shown coupled to the multiple guided mass system 1300. The circuit 716 generates the self-test signal 722, at twice the drive frequency, or 2fd, which is coupled to Node 1 of the multiple guided mass system 1300. Node 1 represents the self-test actuation electrodes 211a-d, 210a-d, or 110a-d, in FIG. 2, depending on which axis is being tested. The phase shifter circuit 718 is shown to generate the drive signal 720, at the drive frequency, fd, to the Node 2 of the multiple guided mass system 1300. The Node 2 of the multiple guided mass system 1300 is coupled to the drive combs 109c-f, in FIG. 2. As previously discussed, the drive combs 109c-f are used to apply electrostatic forces to the proof masses and to vibrate the system 1300.

In operation, the circuit 700 generates the drive signal 720 at the drive frequency (fd) with the use of the signal 741 detected from the drive system which is the drive motion displacement. Drive signal 720 is applied to Node 2, which is connected to the drive comb structures 109 c-f (FIG. 2).

Drive combs are used to apply electrostatic forces to the proof masses and vibrate the drive system. The motion of the drive system is detected at Node 4 which is connected to the drive-sense comb fingers given as 109 a-b and 109 g-h in FIG. 2. The Node 4 is shown coupled to the drive amplifier 740, which serves to convert the capacitance at Node 4 to an output voltage which is proportional to the amplitude of the drive motion. Detected drive motion is coupled to the circuits 716 and 718 for further operation.

In the drive motion, the system 1300 is vibrated at its natural frequency (see FIG. 3), as a result, detected drive motion 741 and drive signal 720 at the drive frequency has 90 degrees phase difference. In the phase shifter circuit 718, detected drive motion signal 741 is phase shifted by 90 degrees and fed back to the system 1300 as an input in order to vibrate the system at its natural frequency.

Another output of the multiple guided mass system 1300 is shown at Node 3, in FIG. 4. The sense motion generated by the Coriolis forces on the proof masses are detected as a capacitance change at Node 3 by the use of electrostatic sense electrodes 660a-b, 112a-b or 522a-b (referring to FIG. 2), depending on which axis is being tested. The sense amplifier 714 converts the capacitance change to sense amplifier output voltage 717 which is proportional to the sense motion of the proof masses and inputs the voltage 717 to the demodulator 708. Sensor amplifier output voltage 717 is modulated by the drive signal 720 at the drive frequency. The demodulated signal is low-pass filtered and provided as the final gyroscope output 712. The output 712 is read by the end user or sent to the circuits which use the output as an input for further operations.

Figure 5:
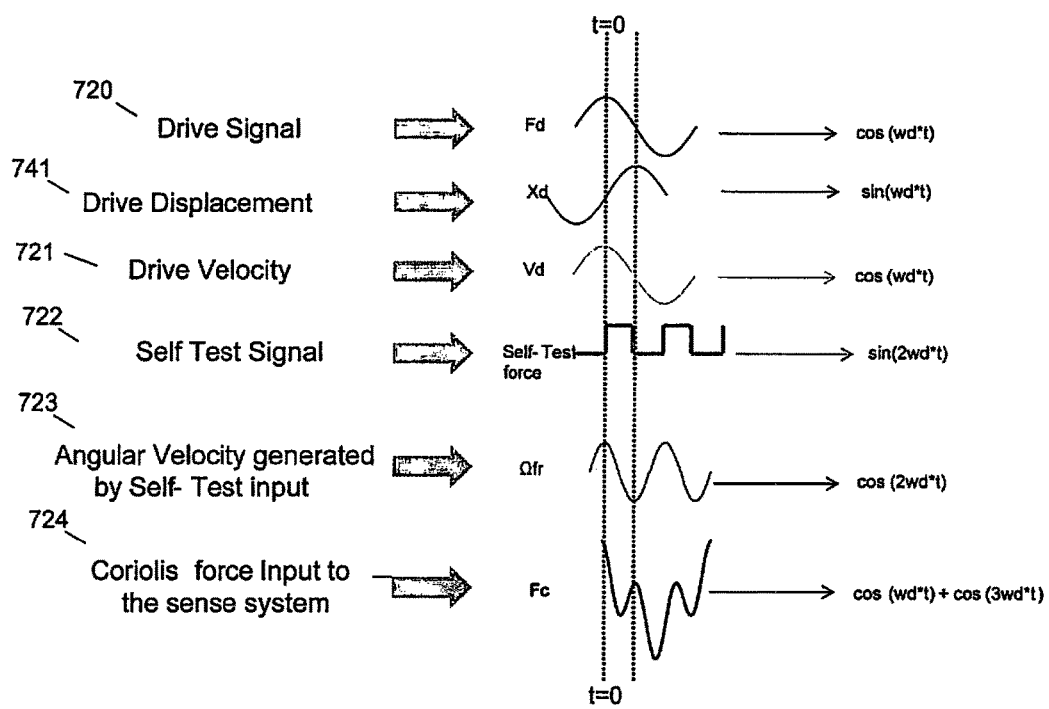
FIGS. 5 and 6 each show the waveforms and phase relationships between different signals applied and sensed from the gyroscope 1300.

FIG. 5 shows the waveforms and phase relationships of the signals given in the circuit schematic in FIG. 4. Drive signal 720 is a cosine signal at the drive frequency. Drive displacement 741 represents the proof mass motion shown in FIG. 3 at the drive frequency and it has 90° phase difference with respect to the drive signal 720. Drive motion velocity 721 has same phase relationship as the drive signal.

The waveform, phase and frequency relationship of the self-test signal 722 with respect to the drive motion is also given in FIG. 5. The self-test signal is given as a square-wave signal which has a frequency of two times the drive frequency. The phase relationship of the self-test signal 722 is arranged in a way that the self-test signal rises at the zero-crossings of the drive displacement. With this phase configuration, an angular displacement that has the same phase as the self-test signal can be generated assuming self-test signal 722 is not at a resonant frequency of the multiple guided mass system. The angular velocity signal 723 generated on the proof masses by the self-test signal is 90° phase shifted and it is a cosine signal at two times the drive frequency. The angular velocity generated on the proof mass imparts a Coriolis force on the sense system 724, which is given by Eq. 6. The Coriolis force applied on the sense system results in a displacement response at the same phase as the Coriolis force and drive force. This displacement response is detected by the electrostatic sense electrodes and converted to capacitance which is then converted to voltage by the sense amplifier 714 and demodulated by the drive signal 720 by the use of the demodulator 708. As a result, the output response 712 of the self-test actuation signal can be taken after the demodulation and low-pass filter 730 stages as given in FIG. 4.

The self-test actuation signal doesn't have to be necessarily applied as a square wave signal, as it is given in FIG. 5. It can also be generated as a sine wave based on the method and circuit used to generate the signal. The self-test actuation signal can be generated using various circuit configurations and methods. In FIG. 4, self-test actuation circuit 716 given as a representation of the self-test actuation circuit and its location in the circuit block. Based on the explanations and phase relationships given above, the self-test signal can be generated by a simple multiplication of the drive signal 720 and drive displacement 741, or it can be generated using a PLL circuit to generate the needed phase given in FIG. 5. As a result, the self-test actuation circuit 716 can consist of either a multiplier or a PLL circuit to generate the needed signal at the correct phase.

Figure 6:
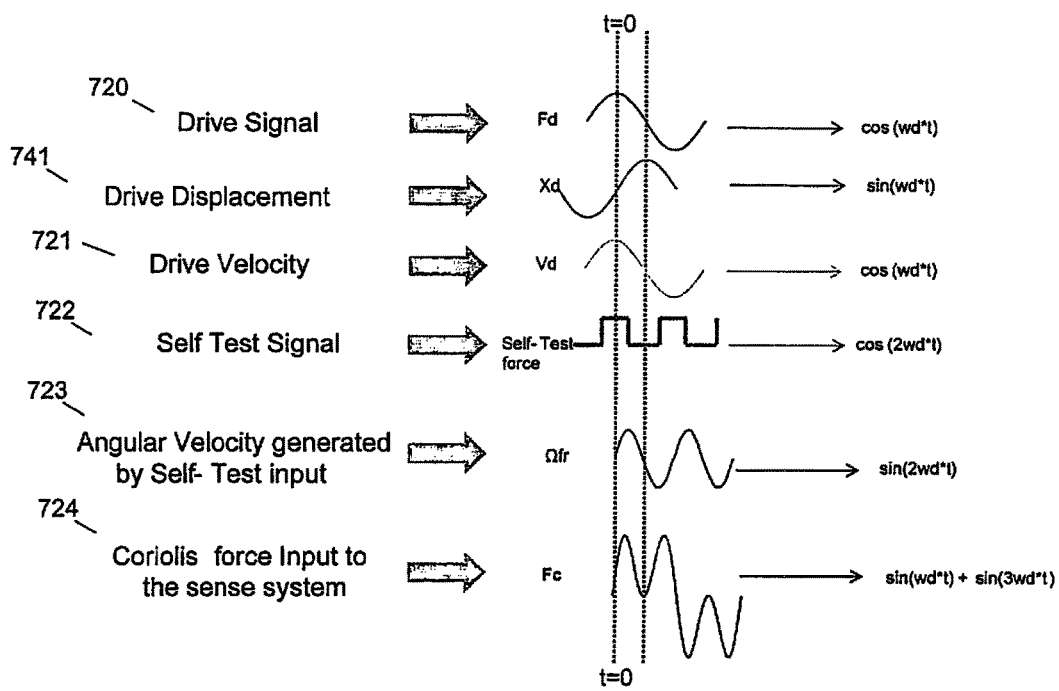

FIG. 6 gives a different configuration and phase relationship of the signals that are given in FIG. 4. Drive force 720, drive displacement 741 and drive velocity 721 are given as the same signals with the same phase relations as in FIG. 5. However, input self-test force has 90° phase difference compared to the one given in FIG. 5. Self-test force is generated in a way that the peak value of the self-test signal 722 coincides with the zero-crossing of the drive displacement. In this configuration, Self-test signal 722 is a cosine signal at two times the drive frequency. Consequently, the angular velocity generated by self-test input and the Coriolis force is a sine wave signal. When the Coriolis force generated by this configuration is applied on the proof mass, the output response of the proof mass is the same phase as drive displacement 741. As a result, for the phase configuration given in FIG. 6, the demodulation signal 720 given in FIG. 4 should be phase shifted by 90° before it is sent to the demodulator 708.

Moreover, the applied self-test frequency need not be precisely at two times the sense frequency. Based on the characteristics of the front-end electronics the self-test actuation frequency can be at a frequency close to 2fd. The self-test output can still be detected by the sense electronics at the side bands of the drive frequency. The governing equation showing the resulting Coriolis force generated due to the rotation which is not exactly at $2fd$ but in the vicinity of it:

$$F_{Coriolis} = 2mX_d\omega_d^2|\theta|[\cos(\omega_d+\lambda)t + \cos(3\omega_d+\lambda)t] \qquad \text{Eq. (7)}$$

Where $\lambda$ is a frequency which is in the bandwidth of the sense electronics detection scheme.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What we claim is:

1. A method of testing a gyroscope comprising:
    in response to a proof mass vibrating in a first direction at a drive frequency in a drive direction, generating a drive motion signal representative of a drive motion in a first direction;
    applying a self-test signal to the proof mass, the self-test signal having a frequency substantially two times the drive frequency, the proof mass being rotated about an input axis using the signal at substantially two times the drive frequency, the applying the self-test signal to the proof mass causing rotation of the proof mass at substantially two times the drive frequency; and
    in response to applying the self-test signal to the proof mass, detecting a change in a Coriolis force generated as a result of the rotation of the proof mass.

2. The method of testing, as recited in claim 1, further including generating the self-test signal by a self test actuation circuit.

3. The method of testing, as recited in claim 1, wherein the detecting a change in the Coriolis force further includes detecting a motion of the proof mass by using electrostatic sense electrodes and a sense amplifier and demodulating the self-test signal at the drive frequency.

4. The method of testing, as recited in claim 1, further including causing driving the proof mass anti-phase along an axis common to an axis about which a second proof mass is driven anti-phase.

5. The method of testing, as recited in claim 1, further including performing self-testing during which the proof mass and a second proof mass are actuated anti-phase along a common direction at the drive frequency.

6. The method of testing, as recited in claim 5, further including during the self-testing, in response to the self-test signal causing an anti-phase motion of one or more frame masses along a second direction, causing the proof mass and the second proof mass to rotate at substantially two times the drive frequency.

7. The method of testing, as recited in claim 6, wherein the anti-phase motion along a second direction of the frame masses results in rotation of the proof mass and the second proof mass at substantially two times the drive frequency about axes parallel to each other and aligned in a third direction.

8. The method of testing, as recited in claim 6, further including detecting the proof mass and the second proof mass rotating at substantially two times the drive frequency about axes parallel to each other and aligned in a third direction by transducers.

9. The method of testing, as recited in claim 1, further including detecting a motion of the proof mass at the drive frequency using electrostatic comb structures.

10. The method of testing, as recited in claim 1, further including detecting a motion of the proof mass at the drive frequency using transducers.

11. The method of testing, as recited in claim 1, further including using a drive comb, applying an electrostatic force to the proof mass to vibrate the proof mass.

12. The method of testing, as recited in claim 1, wherein an amplitude of the motion of the proof-mass along a second direction is proportional to an angular velocity.

13. The method of testing, as recited in claim 1, further including generating a drive signal at a drive frequency in response to detection of a drive motion displacement of the gyroscope.

14. The method of testing, as recited in claim 1, further including detecting movement of the gyroscope in response to a capacitance change at a node of the gyroscope.

15. The method of testing, as recited in claim 14, further including converting the capacitance change at the node to an output voltage proportional to the rotation of the proof mass generating the change to a Coriolis force.

16. The method of testing, as recited in claim 15, further including detecting the drive motion signal with a phase shifted by ninety degrees and provided as input to the gyroscope causing the gyroscope to vibrate at its natural frequency.

17. The method of testing, as recited in claim 1, further including detecting the Coriolis force on the proof mass as a capacitance change at a gyroscope node.

* * * * *